United States Patent [19]

Schuster et al.

[11] Patent Number: 4,936,363

[45] Date of Patent: Jun. 26, 1990

[54] TREAD FOR A PNEUMATIC TIRE WITH CIRCUMFERENTIAL SLOT TO PREVENT THE SPREAD OF RIVER WEAR

[75] Inventors: Daniel E. Schuster, North Royalton; Terry J. Waibel, Wadsworth, both of Ohio

[73] Assignee: The Goodyear Tire & Rubber Company, Akron, Ohio

[21] Appl. No.: 232,056

[22] Filed: Aug. 15, 1988

[51] Int. Cl.⁵ ..................... B60C 11/06; B60C 11/12
[52] U.S. Cl. ........................ 152/209 R; 152/DIG. 3; D12/142
[58] Field of Search .......... 152/209 R, 209 A, 209 D, 152/DIG. 3, 454; D12/141-151

[56] References Cited

U.S. PATENT DOCUMENTS

| | | | |
|---|---|---|---|
| Re. 30,527 | 2/1981 | Verdier | 152/209 |
| D. 65,993 | 11/1924 | Caldwell | |
| D. 132,008 | 4/1942 | Anderson | |
| D. 178,040 | 6/1956 | Crooker et al. | D90/20 |
| D. 207,379 | 4/1967 | Jones | D90/20 |
| D. 215,520 | 9/1969 | Jones | D12/14 |
| D. 216,065 | 11/1969 | Holmes | D12/14 |
| D. 220,605 | 4/1971 | Hoke | D12/14 |
| D. 223,599 | 5/1972 | Busch et al. | D90/20 |
| D. 224,378 | 7/1972 | Newman | D12/15 |
| D. 224,379 | 7/1972 | Busch et al. | D90/20 |
| D. 239,441 | 4/1976 | Yahagi et al. | D12/15 |
| D. 248,227 | 6/1978 | Jamain | D12/146 |
| D. 253,644 | 12/1979 | Peron | D12/146 |
| D. 265,393 | 7/1982 | Hutz | D12/146 |
| D. 269,336 | 6/1983 | Yurkovich | D12/146 |
| D. 270,149 | 8/1983 | Candiliotis | D12/146 |
| D. 271,754 | 12/1983 | Jansen et al. | D12/146 |
| D. 272,053 | 1/1984 | Candiliotis | D12/146 |
| D. 272,815 | 2/1984 | Hatakenaka | D12/146 |
| D. 272,998 | 3/1984 | Takehara | D12/146 |
| D. 275,386 | 9/1984 | Baus | D12/146 |
| 2,272,879 | 2/1942 | Hargraves | 152/209 |
| 2,302,027 | 11/1942 | Havens | 152/209 |
| 2,612,928 | 10/1952 | Buddenhagen | 152/209 |
| 2,779,378 | 1/1957 | Robertson | 152/209 |
| 2,821,231 | 1/1958 | Kraft | 152/209 |
| 2,850,066 | 9/1958 | Nellen | 152/209 |
| 2,926,715 | 3/1960 | Constantakis | 152/209 |
| 3,402,751 | 9/1968 | Jacobs | 152/209 R |
| 3,550,665 | 12/1970 | Verdier | 152/209 |
| 3,570,571 | 3/1971 | Riches | 152/209 |
| 3,675,700 | 7/1972 | Verdier | 152/209 |
| 3,799,231 | 3/1974 | Boileau | 152/209 |
| 3,954,130 | 5/1976 | Verdier | 152/209 |
| 3,971,424 | 7/1976 | Boileau | 152/209 |
| 4,031,938 | 6/1977 | Verdier | 152/209 |
| 4,055,209 | 10/1977 | Senger | 152/209 |
| 4,194,771 | 3/1980 | Jones | D90/20 |
| 4,200,134 | 4/1980 | Takigawa et al. | 152/209 |
| 4,214,618 | 7/1980 | Takigawa et al. | 152/209 |
| 4,258,769 | 3/1981 | Makino et al. | 152/209 |
| 4,262,722 | 4/1981 | Takigawa et al. | 152/209 |
| 4,266,592 | 5/1981 | Takigawa et al. | 152/209 |
| 4,271,885 | 6/1981 | Takigawa et al. | 152/209 |
| 4,271,886 | 6/1981 | Bachmann et al. | 152/209 |
| 4,298,046 | 11/1981 | Herbelleau et al. | 152/209 |
| 4,305,445 | 12/1981 | Yoshioka et al. | 152/209 |
| 4,332,286 | 6/1982 | Takigawa et al. | 152/209 |
| 4,387,754 | 4/1983 | Mirtain et al. | 152/209 |
| 4,424,845 | 1/1984 | Baus et al. | 152/209 |
| 4,449,560 | 5/1984 | Tansei et al. | 152/209 |
| 4,480,671 | 11/1984 | Giron | 152/209 |

FOREIGN PATENT DOCUMENTS

| | | |
|---|---|---|
| 3603034 | 8/1986 | Fed. Rep. of Germany . |
| 140606 | 11/1980 | Japan . |
| 146606 | 7/1986 | Japan ........................... 152/DIG. 3 |
| 2030937A | 4/1980 | United Kingdom . |
| 2120183 | 11/1983 | United Kingdom . |

OTHER PUBLICATIONS

1978 Tread Design Guide, vol. 13, 1978, pp. 17, 136, 156.

Primary Examiner—Michael W. Ball
Assistant Examiner—Geoffrey L. Knable
Attorney, Agent, or Firm—R. J. Slattery, III; R. D. Emerson

[57] ABSTRACT

A tread for a pneumatic tire featuring generally zig-zag ribs defined by wide grooves. Circumferentially extending slots in the ribs are located near the wide grooves. The circumferentially extending slots define an edge zone between the slots and the nearest wide groove and a primary-load zone on the opposite side of the slot. Located in the edge zone there is means for reducing the unit tread pressure in the edge zone as compared to such pressure in the primary-load zone. The circumferential slots together with the means for reducing the unit tread pressure act to provide a breakwater against the spread of irregular wear known as "river wear".

23 Claims, 5 Drawing Sheets

TREAD FOR A PNEUMATIC TIRE WITH CIRCUMFERENTIAL SLOT TO PREVENT THE SPREAD OF RIVER WEAR

BACKGROUND OF THE INVENTION

1. Field of Invention

The present invention relates generally to pneumatic tires and more specifically to heavy duty radial truck tires.

2. Description of the Prior Art

Heavy duty radial truck tires are often characterized by tread patterns utilizing ribs with projecting and reentrant portions in a generally zig-zag pattern. This tread pattern has proven advantageous for a variety of performance criteria. However, this tread pattern has also proven to be susceptible to a type of irregular wear known as "railway wear" or "river wear". River wear is wear in a circumferentially extending rib of a tire tread along the edge zones. The irregular wear spreads across the tread creating an unacceptable appearance and erosion of performance.

In the prior art, tread designers have sought to eliminate or reduce river wear by placing narrow slots in the edges of the tread ribs as in U.S. Pat. No. 4,449,540. Tread designers also modified projecting portions of the tread rib to prevent the initiation of river wear, as in U.S. Pat. Nos. 4,266,592 and 4,200,134. While these techniques have been moderately successful, river wear continues to be a significant source of irregular wear for truck tires used extensively for long distance highway applications.

SUMMARY OF THE INVENTION

The present invention relates to a tread to be used on a tire casing. When on a tire casing, a tire tread according to the present invention has circumferentially extending ribs. The ribs are defined by two circumferentially extending wide grooves, or by one circumferentially extending wide groove and a lateral edge of the tread. At least one of the ribs has at least one circumferential slot. The slot defines an edge zone between the slot and the nearest wide groove and defines a primary-load zone on the opposite side of the slot. In the edge zone is located a means for reducing, when the tire is normally inflated and under load, the unit-tread pressure in the edge zone as compared to such pressure in the primary-load zone.

The combination of the circumferential slots and the means for reducing the unit tread pressure can be used on both sides of a rib and create a zone or zones where river wear can be contained and prevented from spreading to the primary-load zones.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENT

Figure 1:
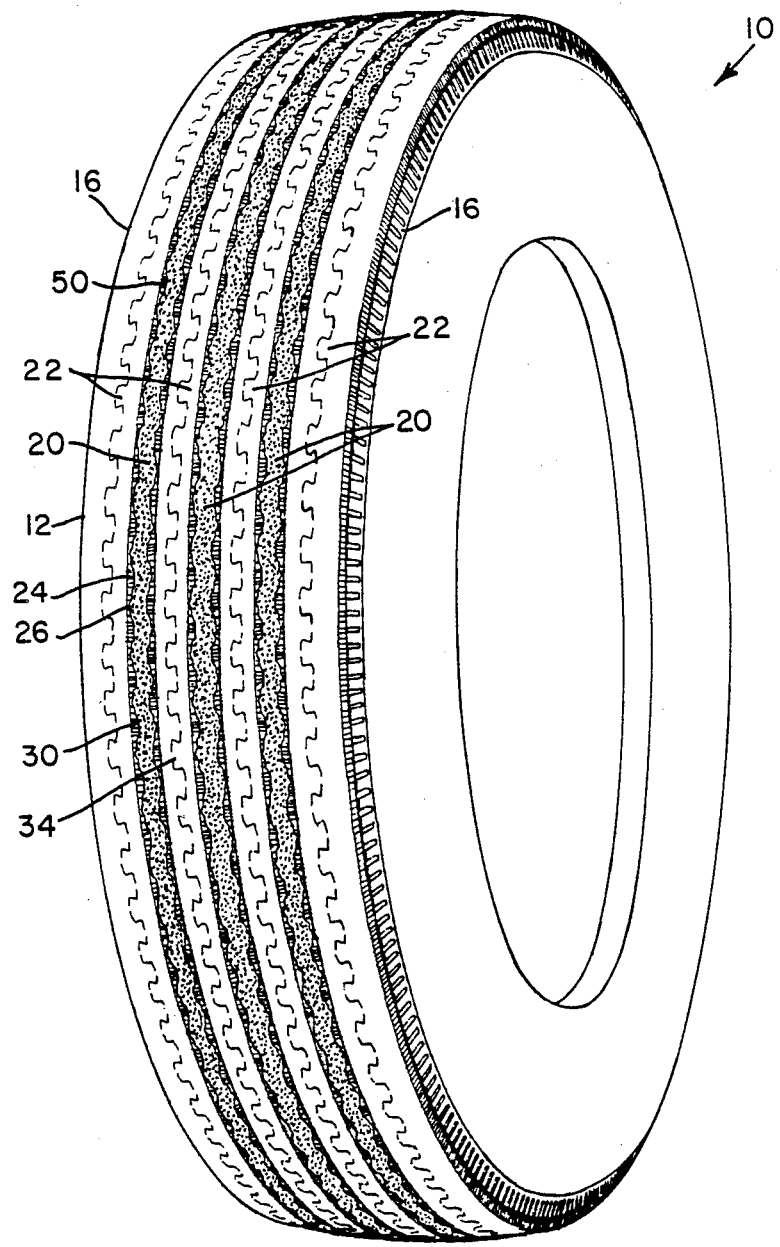
FIG. 1 is a perspective view of a tire utilizing the invention.

The invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial-ply tire" means a belted or circumferentially-restricted pneumatic tire in which the ply cords which extend from bead to bead are laid at cord angles between 65° and 90° with respect to the equatorial plane of the tire.

"Equatorial plane (EP)" means the plane perpendicular to the tire's axis of rotation and passing through the center of its tread.

"Carcass" means the tire structure apart from the belt structure, tread, undertread, and sidewall rubber over the plies, but including the beads.

"Belt structure" means at least two layers or plies of parallel cords, woven or unwoven, underlying the tread, unanchored to the bead, and having both left and right cord angles in the range from 17 degrees to 27 degrees with respect to the equatorial plane of the tire.

"Casing" means the carcass, belt structure, beads, sidewalls, and all other components of the tire excepting the tread and undertread. The casing may be new, unvulcanized rubber or previously vulcanized rubber to be fitted with a new tread.

"Sidewall" means that portion of a tire between the tread and the bead.

"Tread" means a molded rubber component which, when bonded to a tire casing, includes that portion of the tire that comes into contact with the road when the tire is normally inflated and under normal load.

"Unit tread pressure" means the radial load borne per unit area (square centimeter or square inch) of the tread surface when that area is in the footprint and the tire is loaded.

"Footprint" means the contact patch or area of contact of the tire tread with a flat surface at zero speed and under normal load and pressure.

"Tread width" means the arc length of the tread surface in the axial direction, that is, in a plane passing through the axis of rotation of the tire.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Section height" means the radial distance from the nominal rim diameter to the maximum outer diameter of the tire at the road-contact surface nearest its equatorial plane.

"Aspect ratio" of the tire means the ratio of its section height to its section width.

"Compensated tread width" means the tread width multiplied by the aspect ratio.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Groove" means an elongated void area in a tread that may extend circumferentially or laterally about the tread in a straight, curved, or zig-zag manner. Circumferentially and laterally extending grooves sometimes have common portions and may be subclassified as "wide", "narrow", or "slot". The slot typically is formed by steel blades inserted into a cast or machined mold or tread ring therefor. In the appended drawings, slots are illustrated by single lines because they are so narrow. A "slot" is a groove having a width in the range from about 0.2% to 0.8% of the compensated tread width, whereas a "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of the tread regions in which they are located. Slots often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Axial" and "axially" are used herein to refer to lines or directions that are parallel to the axis of rotation of the tire. "Radial" and "radially" are used to mean directions radially toward or away from the axis of rotation of the tire. "Inner" means toward the inside of the tire and "outer" means toward its exterior.

Figure 2:
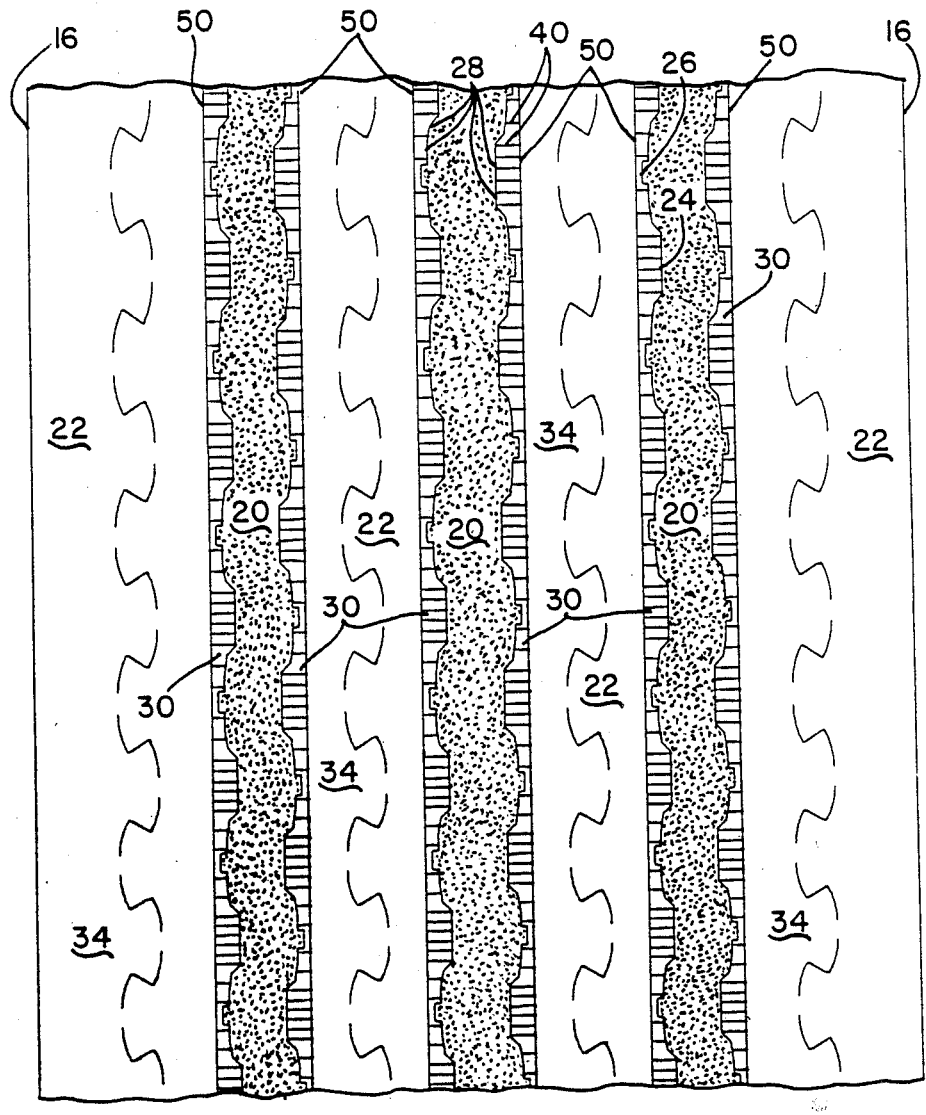
FIG. 2 is a plan view of a section of the tread of the tire shown in FIG. 1.
Figure 3:
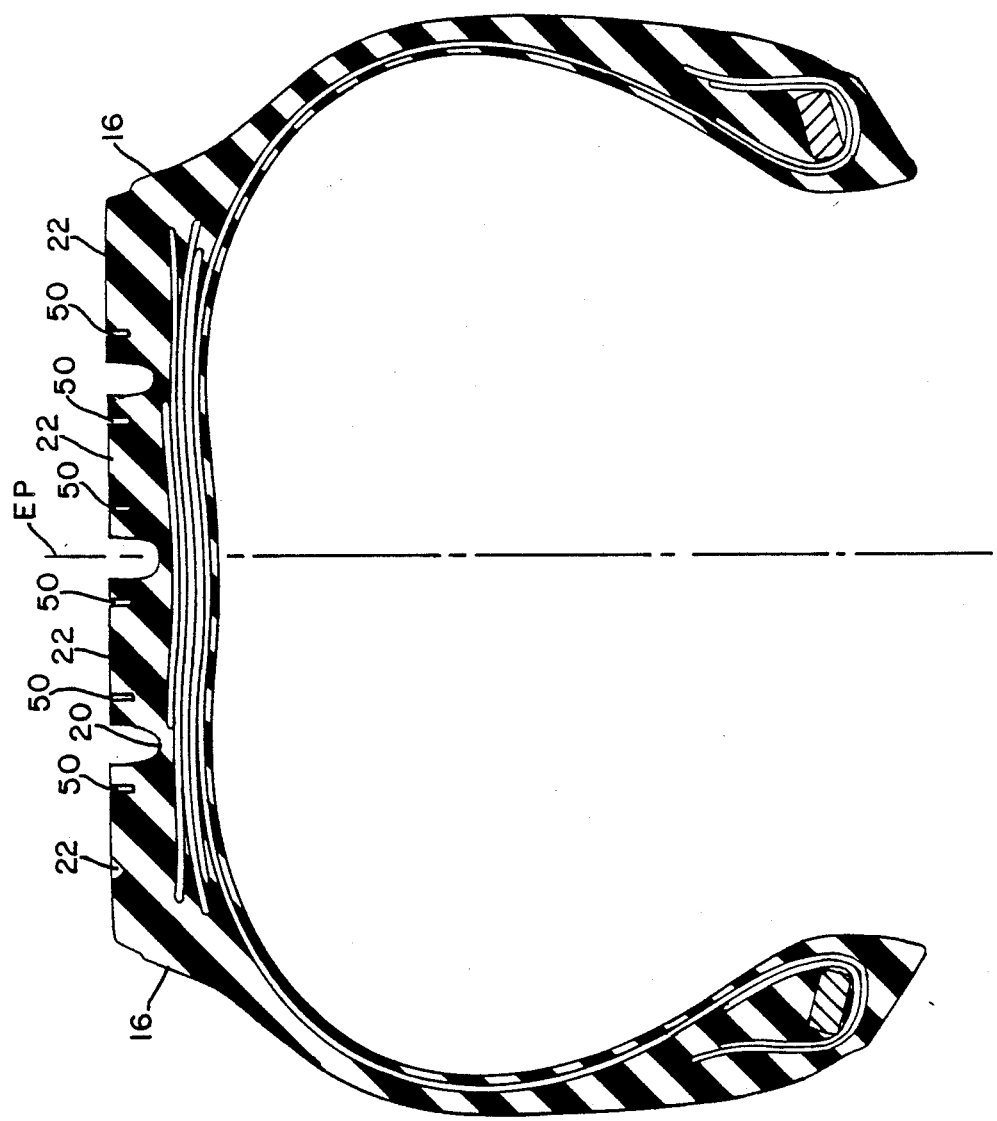
FIG. 3 is a cross-sectional view of one half of the tire shown in FIG. 1.

In the drawings, the same numerals are used for the same components or items in the several views. With particular reference now to FIGS. 1 and 2, there is illustrated a pneumatic tire 10 designed for long distance trucking.

Figure 4:
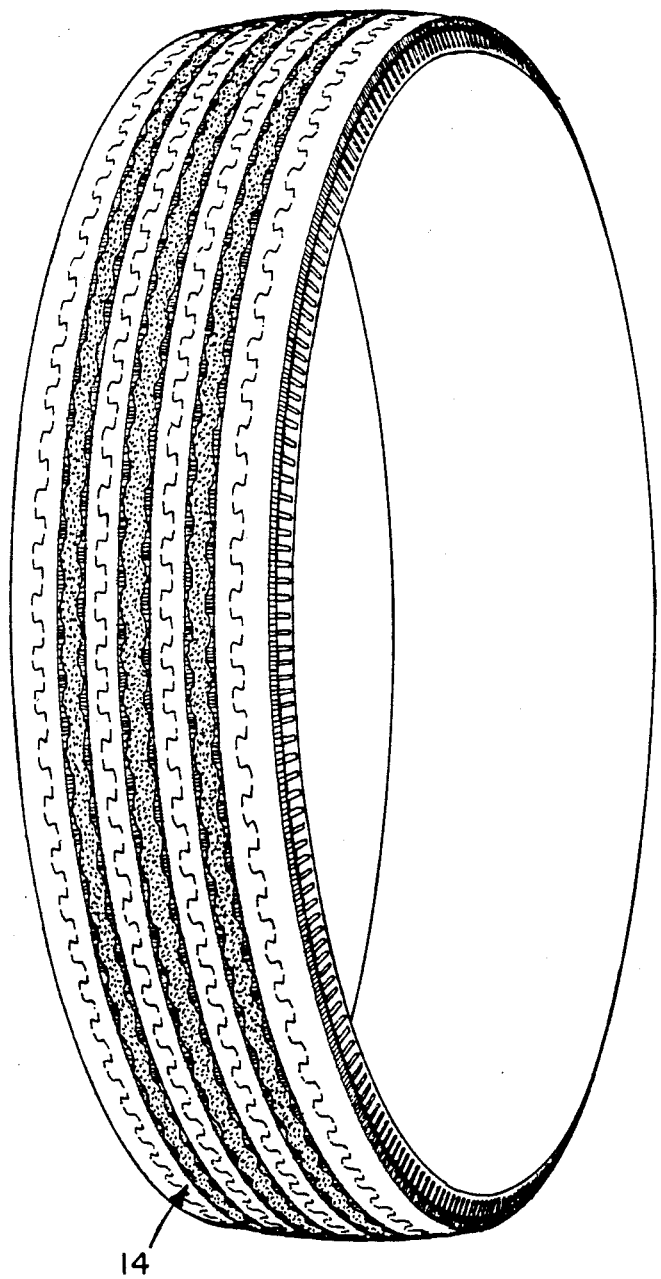
FIG. 4 is a perspective view of another embodiment of the invention.

The tire 10 has a tread 12 incorporating the present invention. While the invention may be practiced in the form of the tread on a new tire as shown in FIG. 1, it may also be practiced in the form of a tread 14 manufactured for retreading purposes as shown in FIG. 4. In a new tire application the tread 12 is attached to a tire casing which has not been vulcanized. The tire casing and tread 12 are vulcanized together in a mold, creating a new tire. In a retreading application, the tread 14 can be "precured", that is, vulcanized prior to being bonded to the casing being retreaded. Alternatively, the tread pattern can be formed and the tread bonded to the casing in a single "mold-cure" retreading operation. For "precured" retreading purposes, the tread 14 may be in the form of a hoop as shown in FIG. 4 or may be in the form of a flat slab which is then wrapped around the circumference of the tire casing.

The tread 12 is characterized by wide grooves 20 which extend generally circumferentially about the tread. The wide grooves define ribs 22 located between the wide grooves. Additional ribs 22 are defined by the lateral edges of the tread 16 and the axially outermost wide grooves. While the invention may be practiced in a tread having only two ribs defined by a wide groove and the lateral edges of the tread, in the currently preferred embodiment of the invention, the tread has three wide grooves 20 and four ribs 22.

The wide grooves 20 extend about the tire in a zig-zag pattern, thereby forming projecting 24 and reentrant 26 portions in the rib. In addition to the zig-zag pattern, small variations in the tread pattern, such as rectilinear sections 28, may be formed at the edge of the rib to achieve traction objectives and to improve the appearance. The width of the wide grooves 20 is between 3% and 15% of the compensated tread width. The depth of the wide grooves is between 3% and 15% of the compensated tread width.

The ribs 22 are divided into edge zones 30 and primary-load zones 34. The ribs may feature various narrow groove and slot patterns chosen to satisfy performance and appearance objectives. The invention may be practiced in treads featuring a variety of circumferentially extending wide and narrow groove arrangements and is not limited to the tread pattern shown in FIGS. 1 through 5.

In the preferred embodiment, the ribs 22 feature alternating projecting 24 and reentrant portions 26 positioned in a generally zig-zag pattern. In each rib defined by two circumferentially extending wide grooves, the projecting portions 24 of each rib are positioned axially opposite the reentrant portions 26 on the same rib. Additionally, the projecting portions of one rib are positioned axially opposite the reentrant portions on the adjacent rib. Preferably the projecting portions have more void areas 40 than the reentrant portions. In the currently preferred embodiment, the projecting portions have void areas 40 in the form of six lateral slots while the reentrant portions have four lateral slots.

At least one slot 50 extends circumferentially in at least one rib 22. Preferably a circumferential slot is located in the rib 22 near the edge of each wide groove 20 as shown in FIG. 1. In the preferred embodiment, the circumferential slots are straight and extend substantially parallel to the equatorial plane EP of the tire. The circumferential slots function as boundary lines to prevent and retard the spread of river wear into the primary-load zone of each rib. Because the rib edge follows the zig-zag pattern previously discussed, and because the edge zone 30 of the rib between the circumferential slot 50 and the wide groove 20 has a lower unit tread pressure than the primary-load zone 34, the circumferential slot oriented parallel to the equatorial plane EP of the tire acts as a breakwater to irregular wear begun at the rib edge. The difference in geometry between the zig-zag rib and the straight circumferential slot works in combination with the abrupt change in unit tread pressure between the edge zone 30 of the rib and the primary-load zone 34 of the rib to confine river wear to the edge zone of the rib.

The circumferential slots 50 are located generally near the rib edge, with the preferred distance being at most about 8% of compensated tread width from the rib edge. If desired, the circumferential slot can intersect the wide groove at reentrant portions. The depth of the circumferential slots is between 2% and 8% of the compensated tread width, with the preferred arrangement being equal to 4.6% of the compensated tread width. It is preferred that the depth of the circumferential slot 50 be equal to that of the depth of the void areas 40. The width of the circumferential slot is between 0.2% and 0.8% of the compensated tread width, with the preferred width being 0.46% of the compensated tread width.

The area of the rib 22 between the circumferential slot 50 and the wide groove 20 is the edge zone 30. The remaining area of the rib 22 is the primary-load zone 34. The purpose of the primary-load zone is to bear the load of the vehicle. The purpose of the edge zone is in part to contain river wear and prevent it from spreading to the primary-load zone of the rib.

This is accomplished by making the edge zone 30 more susceptible to river wear by reducing the unit tread pressure in that zone. Tire treads that are lightly loaded are more apt to develop irregular wear, such as river wear, due to a "scrubbing" action. Similarly, portions of treads that, while in the footprint, bear less radial load than other portions of the tread are apt to wear more rapidly.

The primary-load zone 34 has a higher unit tread pressure than does the edge zone 30. The higher unit tread pressure makes the primary-load zone 34 of the rib less susceptible to river wear and more likely to wear evenly throughout the life of the tire. Similarly, the lower unit tread pressure in the edge zone 30 makes that area of the rib wear more quickly, but in a manner that does not cause the characteristics of river wear generally regarded as undesirable. The circumferential slot 50 functions to separate these two portions of the rib and to keep the river wear from spilling over from the edge zone 30 to the primary-load zone 34.

Figure 5:
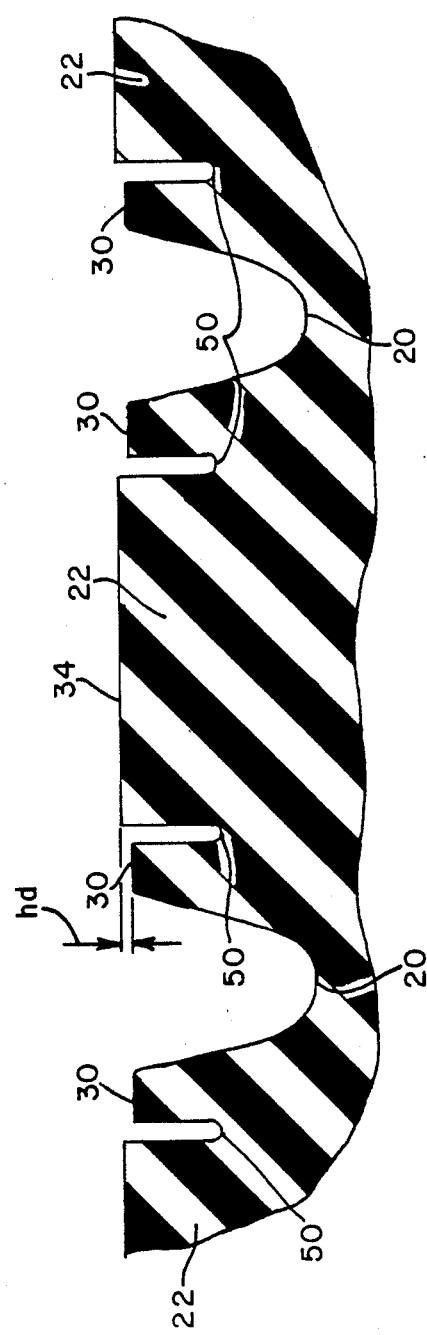
FIG. 5 is a cross-sectional view of one half of a tire illustrating another embodiment of the invention.

The reduction of the unit tread pressure in the edge zone 30 can be accomplished through a variety of means. One means is to design the tread 12 so that the surface of the edge zone is radially inward of the surface of the primary-load zone 34. This embodiment is shown in FIG. 5. The surface of the edge zone is radially inward of the primary-load zone a distance or height differential hd of about 3% of the tread width. Because the primary-load zone is at a higher radius from the axis of rotation than the edge zone, the primary-load zone will contact the road surface before the edge zone. The edge zone will not contact the road surface, and therefore not bear load, until the primary-load zone is loaded sufficiently to deflect to the same radius as the edge zone. In this way, the primary-load zone is loaded more heavily, and therefore has a higher unit tread pressure, than the edge zone.

Another way to lower the unit tread pressure of the edge zone 30 is by creating void areas 40 there. The void areas are portions of the tread where there is no rubber. These void areas extend into the tread surface to various depths and function to reduce the stiffness of that area of the tread. The void areas in the edge zone reduce the strength and stiffness of the edge zone, causing it to deflect more under radial loading than the primary-load zone 34. By deflecting more than the primary-load zone, the edge zone causes the primary-load zone to bear a larger portion of the radial load, resulting in higher unit tread pressures in such zone. The void areas may be of any shape or design to achieve performance and appearance objectives. For example, the void areas may be rectangular slots, circles, ovals, or triangles. The void areas may have radial walls so that the area is generally constant over the depth or they may not. The important feature is that the edge zone 30 has a lower unit tread pressure than the primary-load zone 34 and that the change in unit tread pressure occurs abruptly over the width of the circumferential slot 50.

The area of the void areas 40 should be between 10% and 50% of the area of the edge zone 30, regardless of the depth at which the area is measured. The depth of the void areas is between 2% and 8% of the compensated tread width. In the current preferred embodiment, the depth of the void areas is 4.6% of the compensated tread width. The depth of the void areas should be equal to or less than the depth of the wide grooves. Preferably, the depth of the void areas is equal to the depth of the circumferential slot 50. Preferably, the depth of the circumferential slot is about 40% of the depth of the wide grooves 20.

Because the projecting portions 24 of the ribs 22 are more stiff than the reentrant portions 26, it is preferable to have more void areas 40 in projecting portions of the ribs than in reentrant portions. However the invention can also be practiced when the void areas are equally spaced about the circumference of the tread 12, or with void areas variably spaced, such as by being located only in projecting portions or only in the reentrant portions. In addition, the void areas in a tread may all be of the same area or of differing areas.

The preferred shape of the void areas 40 is that of lateral slots 40. The lateral slots may extend in any direction or orientation but in the preferred embodiment they are parallel to each other and to the tire's axis of rotation. The lateral slots may intersect with the circumferential slot 50, with the wide grooves 20, with both, or with neither. In the currently preferred embodiment, the lateral slots intersect and are interconnected with the wide grooves and the circumferential slot.

The lateral slots 40 in one tread 12 can be of equal size or of different sizes. They can be spaced equally or unequally about the circumference of the tread. In the currently preferred embodiment, the lateral slots are of equal size and are spaced unequally about the tread. More lateral slots are located in the projecting portions 24 of the tread than the reentrant portions 26. The depth of the lateral slots should be in the range previously established for the depth of the void areas 40. In the preferred embodiment, the depth of the lateral slots is equal to that of the circumferential slot 50, which is equal to 40% of the depth of the wide grooves 20. The width of the lateral slots is between 0.2% and 0.8% of the compensated tread width, with the preferred width equal to 0.46% of the compensated tread width.

Based on the foregoing description of the invention, what is claimed is:

1. A tread for a radial ply pneumatic tire, the tread when on the tire casing comprising:
   a circumferentially extending rib being defined between two circumferentially extending wide grooves having a width greater than 3% of the compensated tread width, said rib having alternating projecting portions and reentrant portions formed by said wide grooves;
   the rib having at least one circumferential straight slot in the rib, the straight slot having a width in the range from about 0.2% to 0.8% of the compensated tread width and defining an edge zone between the straight slot and the nearest wide groove on one side of the slot and defining a primary-load zone on an opposite side of the slot; and
   means for reducing, when the tire is normally inflated and under load, the unit tread pressure in the edge zone as compared to such pressure in the primary-load zone, for preventing and retarding the spread of river wear beyond the straight slot into the primary-load zone, wherein the means for reducing the unit tread pressure are void areas within the edge zone.

2. A tread as in claim 1 wherein each projecting portion and each reentrant portion has at least two void areas.

3. A tread as in claim 2 wherein the tread has two or more ribs.

4. A tread as in claim 2 wherein more than one of the ribs is of the type defined in claim 1.

5. A tread as in claim 2 wherein the maximum axial distance between the circumferential slot and the nearest wide groove is less than 8% of the compensated tread width.

6. A tread as in claim 2 wherein the minimum axial distance between the circumferential slot and the nearest wide groove is 0.3% of the compensated tread width.

7. A tread as in claim 2 wherein the depth of the circumferential slot is between 30% and 100% of the depth of the nearest wide groove.

8. A tread as in claim 2 wherein the void areas are substantially equally spaced circumferentially about the tread.

9. A tread as in claim 2 wherein the depth of the void areas is between 30% and 100% of the depth of the nearest wide groove.

10. A tread as in claim 2 wherein the area of the void areas is between 10% and 50% of the area of the edge zone.

11. A tread as in claim 2 wherein the volume of the void areas is between 10% and 50% of the volume defined by the tread surface area of the edge zone, multiplied by the depth of the void areas.

12. A tread as in claim 2 wherein the depth of the circumferential slot is equal to the depth of the void area.

13. A tread as in claim 2 wherein the circumferential slot intersects the wide groove at the reentrant portions.

14. A tread as in claim 2 wherein a projecting portion of the rib is positioned axially opposite a reentrant portion on the same rib.

15. A tread as in claim 2 wherein the tread has a second rib as defined in claim 1, projecting portions of the edge mentioned rib being positioned axially opposite reentrant portions of the second rib.

16. A tread as in claim 2 wherein the projecting portions have more void areas than the reentrant portions.

17. A tread as in claim 2 wherein the void areas are lateral slots.

18. A tread as in claim 17 wherein the lateral slots are parallel to the tire's axis of rotation.

19. A tread as in claim 2 wherein each of the ribs has two circumferential slots and is defined by two circumferentially extending wide grooves, the void areas being lateral slots extending all or a majority of the respective distances from each of such wide grooves to the nearest of such circumferential slots.

20. A tread as in claim 19 wherein the lateral slots are parallel to the tire's axis of rotation.

21. A tread as in claim 2 wherein each of the ribs defined by two circumferentially extending wide grooves has two circumferential slots, each of the wide grooves and adjacent circumferential slots being interconnected by a plurality of lateral slots.

22. A tread for a radial ply pneumatic tire, the tread when on the tire casing comprising:

a circumferentially extending rib being defined between two circumferentially extending wide grooves having a width greater than 3% of the compensated tread width, said rib each having alternating projecting portions and reentrant portions formed by said wide grooves;

the rib having at least one circumferential straight slot in the rib, the straight slot having a width in the range from about 0.2% to 0.8of the compensated tread width and defining an edge zone between the straight slot and the nearest wide groove on one side of the slot and defining a primary-load zone on an opposite side of the slot; and means for reducing, when the tire is normally inflated and under load, the unit tread pressure in the edge zone as compared to such pressure in the primary-load zone, for preventing and retarding the spread of river wear beyond the straight slot into the primary-load zone, wherein the means for reducing the unit tread pressure comprises the edge zone, for an axial distance of less than 3% of the compensated tread width, being radially inward of the primary-load zone by a distance of less than 3% of the compensated tread width.

23. A tread for a radial ply pneumatic tire, the tread when on the tire casing comprising:

four circumferentially extending ribs, two of the ribs being defined by three circumferentially extending wide grooves and the other two ribs each being defined by one of the circumferentially extending wide grooves and a lateral edge of the tread; and each rib having alternating projecting portions and reentrant portions formed by the wide grooves six circumferential slots in the ribs, each circumferential slot being located at most 8% of the compensated tread width from a wide groove, each of the circumferential slots being straight and parallel to the equatorial plane of the tire, each of the circumferential slots having a width between 0.2% and 0.8% of the compensated tread width and a depth between 30% and 100% of the deepest wide grove depth; and lateral slots extending from each of the circumferential slots to the nearest of the wide grooves, the lateral slots having a width between 0.2% and 0.8% of the compensated tread width and a depth of between 30% and 100% of the deepest wide groove depth.

* * * * *